June 5, 1928.                                                    1,672,597
C. W. BHOSYS
PHOTOGRAPHIC LIGHTING APPARATUS
Original Filed Jan. 10, 1927
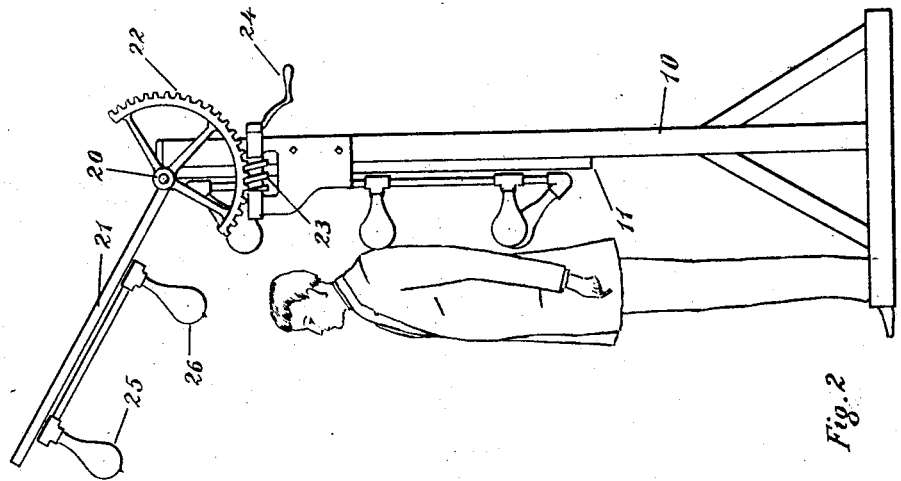
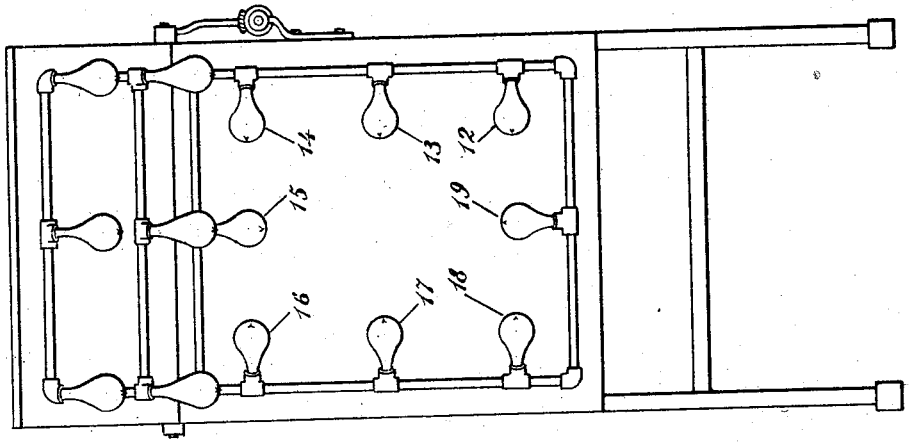
Inventor
Charles W. Bhosys
by Guido M. Saurdote
Attorney Patented June 5, 1928.

1,672,597

UNITED STATES PATENT OFFICE.

CHARLES WILLIAM BHOSYS, OF NEW YORK, N. Y.

PHOTOGRAPHIC LIGHTING APPARATUS.

Original application filed January 10, 1927, Serial No. 160,316. Divided and this application filed July 14, 1927. Serial No. 205,819.

This invention relates to apparatus for directing and controlling light to be thrown upon photographic subjects, and more particularly refers to a portable device which may be used both for generating and for controlling the distribution of light to be used for photographic purposes.

The primary object of this invention is to provide an apparatus of a simple and inexpensive construction, comprising means for generating as well as means for reflecting and directing light upon subjects to be photographed, said device being adapted to replace the permanent installations of a more costly character frequently used now in photographic studios.

Another object is to provide in an apparatus of the class specified, an overhead panel adapted to be set at various angles in order to properly direct and regulate the amount of light thrown against a subject to be photographed, and means of a simple and effective character whereby the control of said panel may be effected.

Other objects and advantages of the present invention will more fully appear as the description proceeds and will be set forth and claimed in the appended claims.

This application is a division of application No. 160,316 for apparatus for lighting photographic subjects, now pending and the invention forming the object thereof, is illustrated in the annexed drawings, in which:

Fig. 1 is a front view in elevation of an apparatus adapted for use in lighting photographic subjects embodying the main feature of my invention; and Fig. 2 is a side view in elevation of the same.

The main feature of my invention resides in the possibility of providing an intense illumination adapted to be adjustably distributed upon a subject to be photographed, by means of an apparatus of simple design, preferably of a portable and inexpensive character.

The use of artificial light for taking pictures in photographic studios generally entails the necessity of making expensive installations as well as the employment of powerful lamps. By using a number of bulbs of relatively moderate intensity, suitably distributed upon a board or combination of boards, of a portable and adjustable nature, I am able to produce an apparatus of relatively inexpensive construction occupying a very small space and adapted to be placed at any point in the studio to best advantage; so that the device only may be used for the illumination of a subject or the same may be so placed that it will cooperate with the daylight available in properly illuminating said subject.

An apparatus embodying my invention is represented in Figs. 1 and 2, where 10 designates a stand preferably movable, on which is mounted on a vertical panel 11, carrying a plurality of electric bulbs 12, 13, 14, 15, 16, 17, 18, 19, suitably distributed upon its surface. In the preferred arrangement shown, said bulbs are arranged in rectangular series near the periphery of the panel and are mounted so as to converge inwardly towards a point in front of the panel.

In this manner, the rays of light emitted from the sides of the bulbs strike the panel at an angle and are reflected thereby, in a practically horizontal direction. Thus, a subject to be photographed, placed beside the panel will be exposed to both the light directly issuing from the bulbs and to the light reflected by the panel.

At the upper part of said stand is mounted a horizontal shaft 20, carrying a panel 21, which may be caused to assume a more or less inclined position, by means of a worm segment 22 secured to said shaft and a worm 23 in mesh therewith, operated by means of a crank lever 24.

Said panel 21 carries a plurality of electric bulbs 25, 26, which may be arranged in two or more rows as shown and which are mounted on the panel at an angle, for instance at 90 degrees, as shown, preventing the possibility of the bulbs remaining placed with their axes in a vertical direction, when panel 21 is in any one of its upwardly inclined positions.

I have found that when the bulb or bulbs used are disposed with their longitudinal axes in a substantially vertical direction, whether directed downwardly or upwardly, a reflection of the incandescent wire in the bulb or bulbs will be produced on the retinas of the eyes of the subject with objectionable results in the picture. The very same thing happens when the subject is a picture to be reproduced and is therefore held in a clamping frame behind the surface of a glass pane. In such case, the glass surface will show a reflection of the incandescent wire of the bulb or bulbs are vertically arranged, and said reflection causes the picture to be blurred and confused.

On the other hand, if the bulb or bulbs are arranged with their axes in any other direction but vertical, this reflection will not take place, and satisfactory pictures will be obtained.

The bulbs carried by panel 21, may be mounted at right angle to the panel as shown, because the panel is generally set in an upwardly inclined direction, as shown, and this causes the bulbs to be arranged in a direction inclined to the vertical.

The object of panel 21 is to throw a beam of light downwardly, ahead of the device, so as to strike for instance, various persons to be photographed in a group independently of one another.

The apparatus is intended to be placed at one side of the subject or subjects to be photographed, and it is obvious that if there are various members of a group facing the camera, and the apparatus is placed at one side the horizontally directed rays issuing from panel 11 would only strike the member of the group which is nearest to the device, this preventing the light from reaching the other members of the group.

In such a case the usefulness of an inclined panel above, throwing a beam of light in an inclined direction, reaching all the members of the group becomes apparent, because the possibility of the light becoming obstructed by any one member of the group is thus entirely avoided.

The light issuing from panel 21 is also extremely useful in setting in evidence, details of a subject such as a person or a piece of sculpture and the like, which would be lost if side illumination only were used; this advantage is also of great value in the field of commercial photography where every detail of the photographed objects must be made apparent.

In Fig. 2, the subject is arranged with his back towards the front of the device, with the lights directed towards it from the sides slightly to the rear and from the top; this arrangement being suitable for taking a profile photograph of the subject.

By adjusting the inclination of panel 21, and by separately controlling the various bulbs, an infinite variety of lighting effects may be produced, which enable the photographer to turn out his work to the best advantage. The proper control of light is one of the essentials in modern photography if pictures of a high artistic value are to be produced, and heretofore this factor has been the chief difficulty in confronting the operators in photographic studios.

The necessity of providing ample illumination and a flexible and thorough control thereof, had led to the adoption of expensive installations which are beyond the reach of the average studio of moderate size; my present invention makes it possible to obtain all the desired advantages permitting the production of the highest grade of work at comparatively small expense.

As a general rule, when artificial light is used in a photographic studio, the same is not projected directly upon the subject but is controlled and reflected by means of reflectors or screens, the main object of which is usually to create a diffuse light effect in order to avoid sharp reliefs and high lights in the picture.

It has been my experience however, that while light thus reflected and diffused improves to a certain extent, the relative tone values of a picture, the necessary intensity of illumination is usually lacking, so that the work produced is not as good as would be obtained by daylight.

It is therefore of the utmost importance that the reflected light effect be retained but at the same time it is equally important that the full intensity of the light available be utilized.

By combining as I do, the direct light obtainable from the bulbs with the light reflected by the screens or panels, I obtain a light which is both powerful and mellow, providing an ideal condition for the taking of pictures by artificial light. Moreover, the light is easily controllable both on account of the individual control of the bulbs and on account of the gradual control of the inclination of the upper panel made possible by the gear operating mechanism illustrated.

The combination of the vertical panel together with the inclinable upper panel is important in many cases as stated, especially when there is a group of persons to be photographed. The function of the inclinable panel is to throw the light between various subjects composing a group from above, so as to prevent the subject nearest the vertical panel from cutting off the light of the next subject at his side. The vertical panel has the important function of providing a horizontally directed illumination for the front parts of the individuals composing the group, that is, for those parts of their bodies which are not contiguous and which are not likely to overshadow one another. The vertical panel is just as essential as the overhead panel and without one or the other, the device would be incomplete and its usefulness would be seriously curtailed.

Of course, there are no set rules for the lighting of subjects when taking a picture, and some times both panels may be used for illuminating the subject or the vertical panel or the overhead panel only may be used as the case may be.

The device is used in each case entirely according to the judgment of the photographer, the object of the device being to provide the operator with just such a means as he needs for regulating the light in various directions and from various angles.

A vertical panel or an inclinable panel only would have limitations in this respect, which are overcome by the combination shown. In view of the important character of the part played by light in the photographic art, it is desirable that a delicate system of control be available for producing changes in the various lighting effects; therefore, the worm gearing used, or its equivalent providing a gradual angular displacement of the upper panel, as well as a positive control of the position at which the panel is finally set, is a useful and important feature of the device.

The apparatus is capable of providing an intense illumination when required, toned down and distributed more uniformly by the reflecting surfaces of the panels; furthermore, the device is also suitable as stated, for depth illumination such as required in the photographing of a number of persons or objects.

From the foregoing it is seen that my apparatus represents a decided improvement in the photographic art, in providing as it does, means for using artificial light to best advantage, said means being of a portable and relatively inexpensive nature.

It is obvious that my invention may be altered in its various details without substantially departing from the inventive idea, and accordingly the drawings will be understood as being intended for illustrative purposes only and not in a limiting sense. Therefore, I reserve myself the right to carry my invention into practice in any way or manner which may enter, fairly, into the scope of the appended claims.

I claim:

1. Apparatus for lighting photographic subjects, comprising a panel mounted in a substantially vertical plane, an upwardly inclined additional panel mounted at the top thereof, light generating means carried by said vertical panel, and light generating means carried by said inclined panel at points forwardly spaced from the light generating means carried by said vertical panel.

2. Apparatus for lighting photographic subjects, comprising a panel mounted in a substantially vertical plane, another panel mounted at the top thereof, means for setting said top panel at various inclined positions in relation to said vertical panel, and light generating means carried by said top panel at points forwardly spaced from the light generating means carried by said vertical panel.

3. Apparatus for lighting photographic subjects, comprising a portable stand, a vertical panel mounted thereon, another panel mounted at the top thereof, means for setting said top panel at various inclined positions in relation to said vertical panel, and light generating means carried by said top panel at points forwardly spaced from said vertical panel.

4. Apparatus for lighting photographic subjects, comprising a portable stand, a vertical panel adjustably mounted on a transversal pivot thereon, another panel mounted at the top thereof, light generating means carried by said vertical panel, light generating means carried by said top panel at points forwardly spaced from the light generating means carried by said vertical panel, and a worm gearing controlling the operation of said adjustable panel.

CHARLES WILLIAM BHOSYS.